Oct. 12, 1943.   V. J. KELLER   2,331,784
INTERNAL COMBUSTION MOTOR
Filed Dec. 3, 1942   4 Sheets-Sheet 1
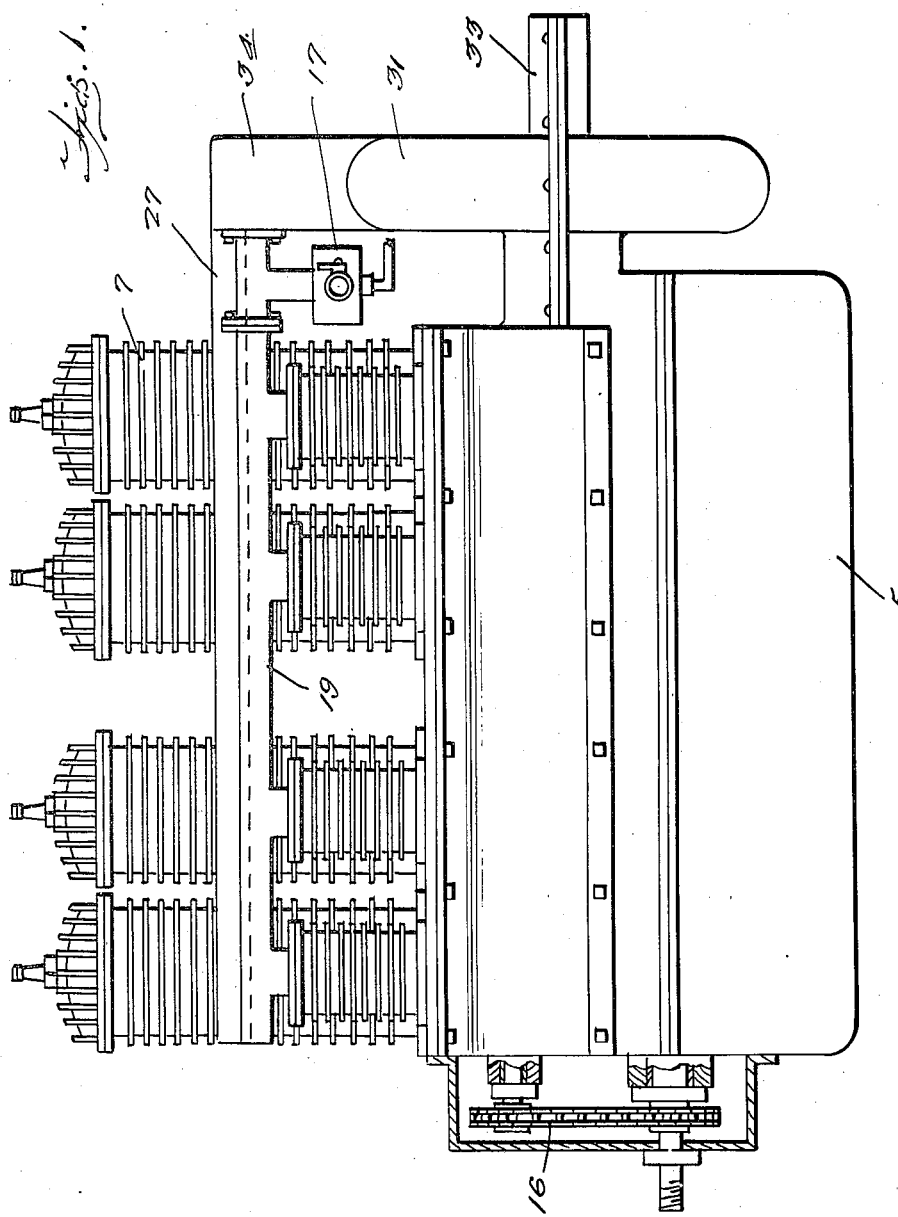
Inventor
Vincent J. Keller
By Clarence A. O'Brien
and Harvey B. Jacobson
Attorneys

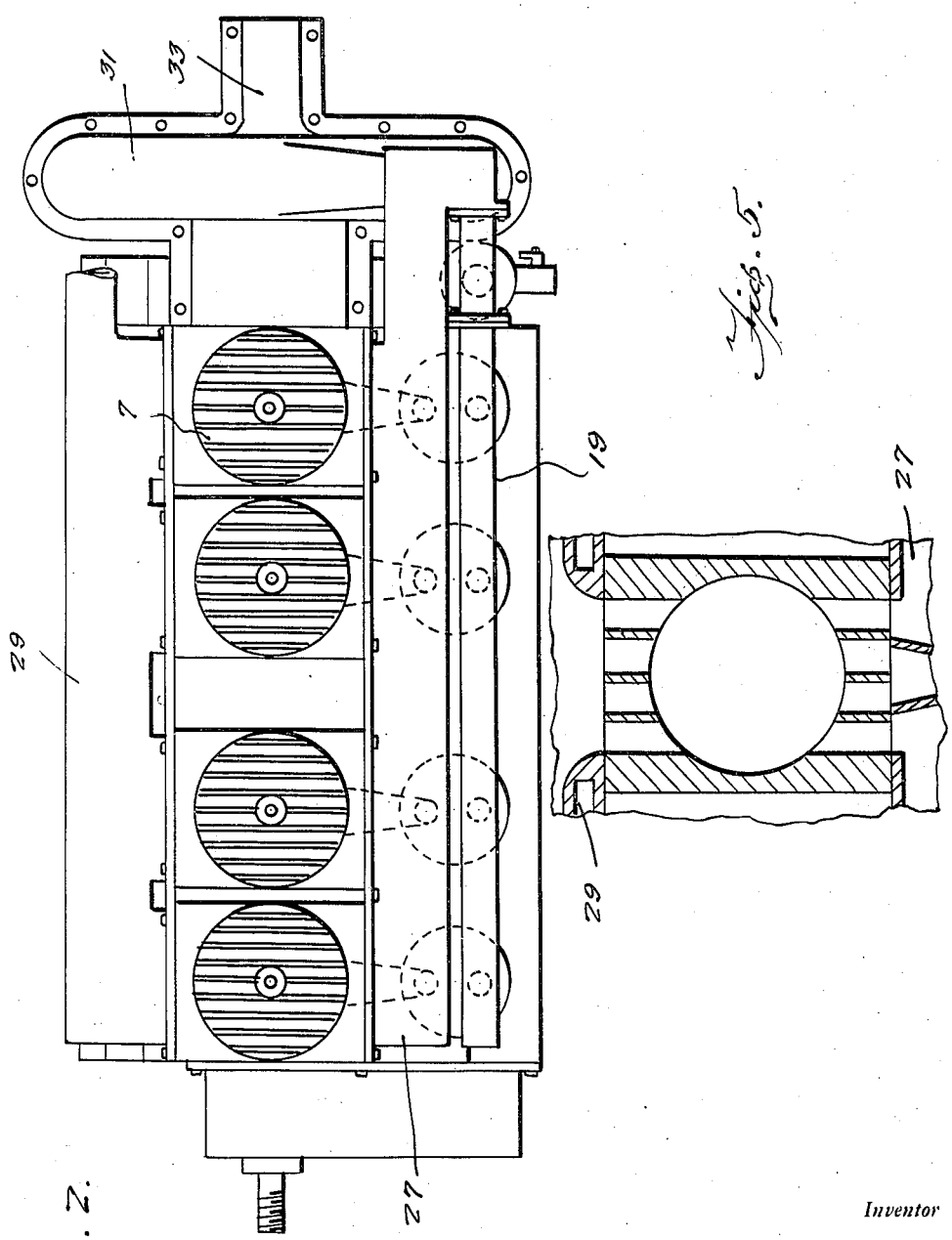

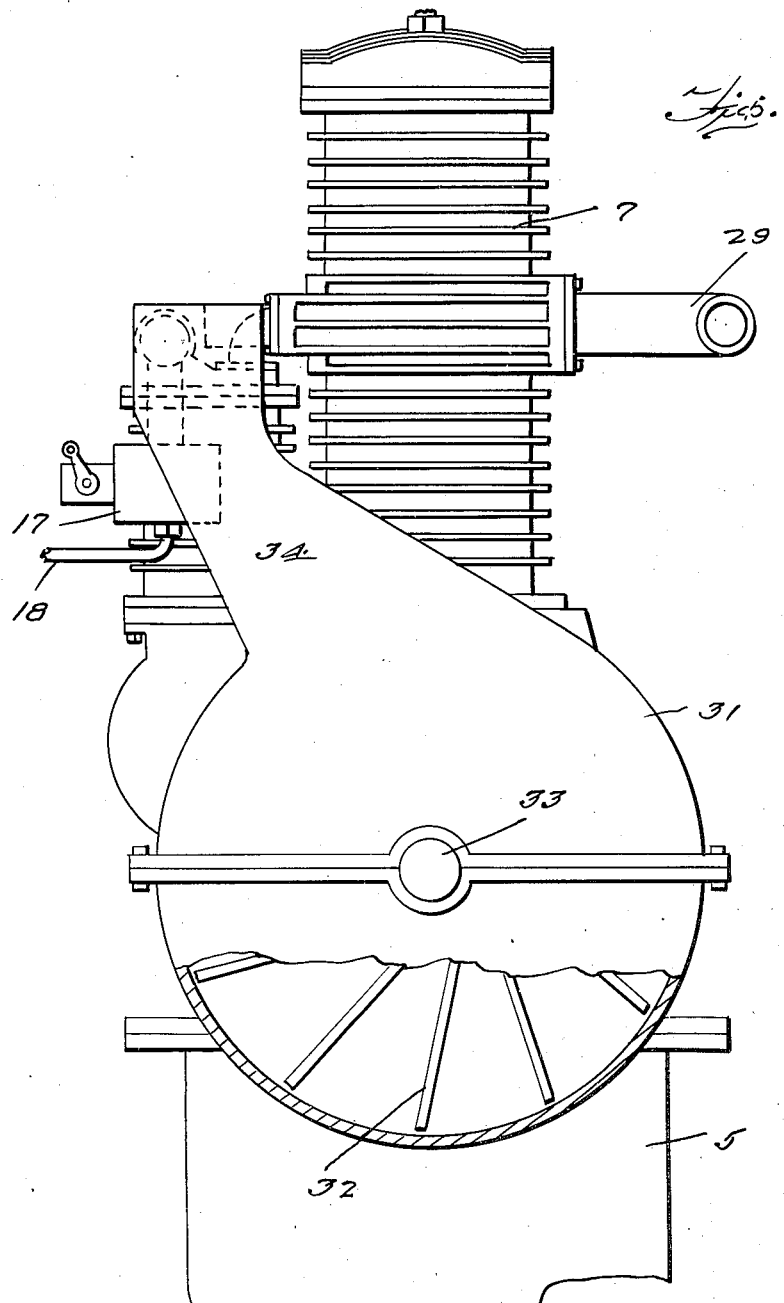

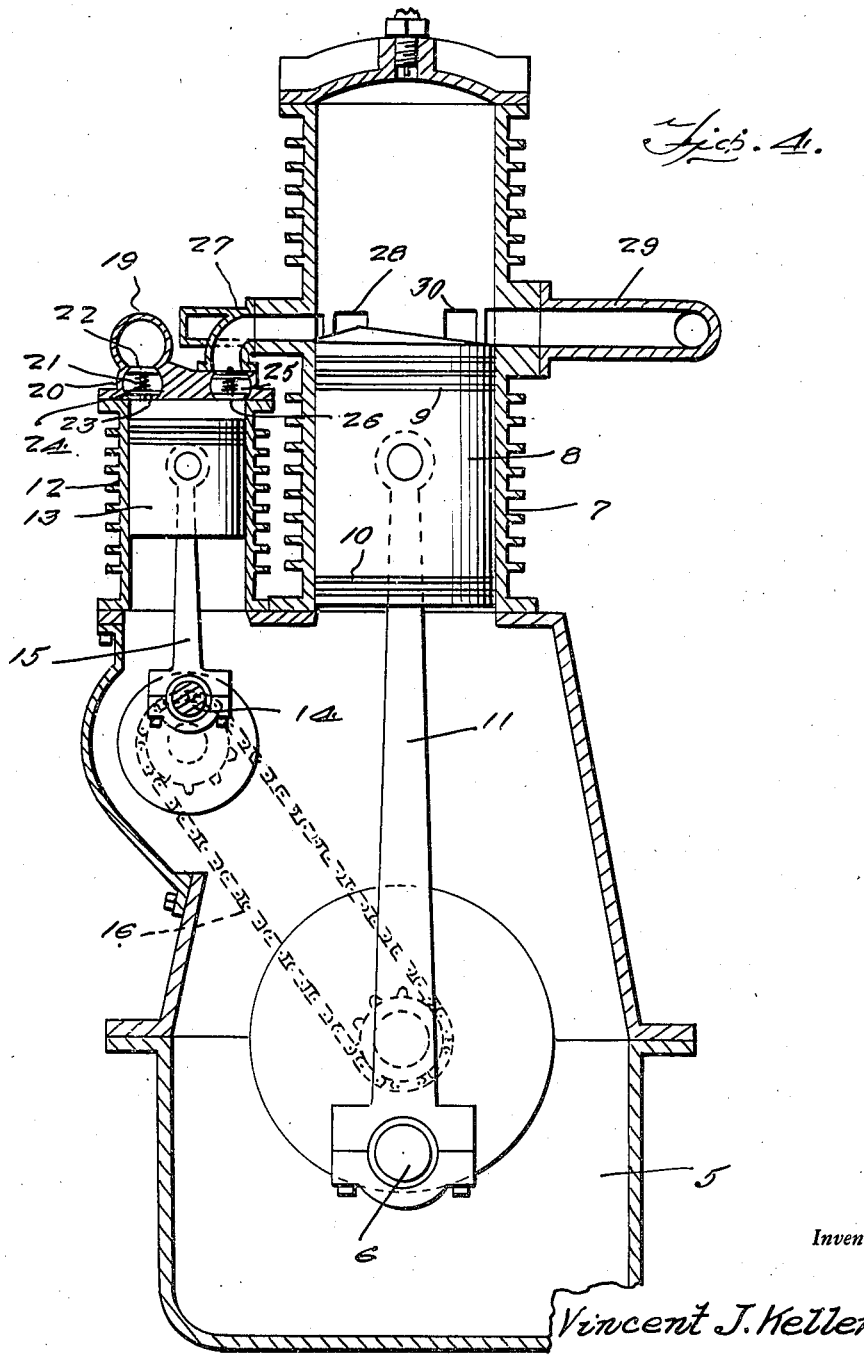

Patented Oct. 12, 1943

2,331,784

UNITED STATES PATENT OFFICE 2,331,784

INTERNAL COMBUSTION MOTOR

Vincent J. Keller, Davenport, Iowa

Application December 3, 1942, Serial No. 467,772

1 Claim. (Cl. 123—69)

The present invention relates to new and useful improvements in internal combustion engines and constitutes an improvement of my prior Patent No. 2,252,512 dated August 12, 1941.

An object of the present invention is to provide means for compressing the fuel and injecting the same into the combustion chamber of the cylinder whereby to improve the efficiency and economy of the motor.

A further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view of the motor.

Figure 2 is a top plan view with the head removed.

Figure 3 is an end elevational view with parts broken away and shown in section.

Figure 4 is a vertical transverse sectional view, and

Figure 5 is a fragmentary sectional view through one of the combustion cylinders.

Referring now to the drawings in detail wherein for the purpose of illustration I have disclosed a preferred embodiment of the invention, the numeral 5 designates the crankcase in which the crankshaft is journaled and a plurality of cylinders 7 extend upwardly from the crankcase, each cylinder having an elongated piston 4 working therein provided with the upper and lower piston rings 9 and 10, respectively. The pistons are connected with the cranks of the crankshafts by the connecting rods 11.

Adjacent each of the cylinders 7 is a fuel injection cylinder 12 having a piston 13 working therein and which is connected to a crankshaft 14 by means of a connecting rod 15. The crankshaft 14 is driven from the crankshaft 6 by means of a chain drive 16.

The carburetor of conventional construction is shown at 17 having the fuel line 18 leading thereto, the carburetor supplying vaporized fuel to an intake manifold 19 which is connected to the respective heads 20 secured on top of the injection cylinders 12.

A passage 21 affords communication between the manifold 20 and each of the injection cylinders 12, the passage 21 being controlled by a check valve 22 mounted in a guide 23 in the passage, the valve being normally closed by a spring 24 and arranged to be opened by the suction stroke of the piston 13.

The head 20 is also formed with a discharge passage 25 also having a check valve 26 positioned therein of a construction similar to the valve 22 and arranged to be opened upon the compression stroke of the piston 13.

The passage 25 communicates with a manifold 27 connected to an intermediate portion of the cylinder 7 by means of ports 28, the manifold 27 extending longitudinally of the bank of cylinders along one side of the engine.

Extending longitudinally along a relatively opposite side of the engine is an exhaust manifold 29 which communicates with the cylinder 7 by means of a port 30.

A fan or impellor casing 31 is supported at one end of the motor and contains the fan or impellor 32 which is attached to one end of the crankshaft 6 through a suitable gear connection (not shown).

The casing 31 is provided with a centrally arranged air inlet member 33 and an exhaust passage 34 communicating with the manifold 27 as well as with the intake manifold 19.

The intake and exhaust ports are arranged to permit the latter to open at approximately 75% of the completion of the combustion stroke of the main piston 8 and at approximately 85% of the completion of the combustion stroke the intake ports open to admit air and fuel vapor from the injector cylinder and air from the manifold 27.

The air impellor 32 provides air pressure in the manifold 19 of the injector cylinder as well as in the manifold 27 of the combustion cylinder.

The mixture of fuel vapor from the carburetor and air is compressed in the injector cylinder and in the passage leading to the compression cylinder when the piston 13 reaches its compression stroke and as soon as the piston 8 moves downwardly to open the intake ports the compressed fuel as well as air from the manifold 27 are simultaneously admitted to the compression cylinder.

The pistons 8 and 13 are arranged for opposite actuation so that the piston 13 is moving in its compression stroke during the suction stroke of the piston 8.

It is believed the details of construction, operation and manner of use of the device will be readily understood from the foregoing without further detailed explanation.

Having described the invention, what is claimed as new is:

In a motor of the class described, a crankshaft, a combustion cylinder having a piston working therein and connected to the crankshaft, intake and exhaust ports in the side of the cylinder, an injector cylinder having a piston working therein, means operatively connecting said last-named piston to the crankshaft, an intake manifold for the combustion cylinder, a passage connecting the injector cylinder with the combustion cylinder, a check valve therein, an intake manifold for the injector cylinder, means common to both manifolds for feeding air under pressure thereto, a check valve in the intake manifold for the injector cylinder, and a carburetor connected to the manifold for the injector cylinder at a point between the air feeding means and the last-named cylinder.

VINCENT J. KELLER.